(12) United States Patent
Tozawa et al.

(10) Patent No.: US 6,564,841 B2
(45) Date of Patent: May 20, 2003

(54) PNEUMATIC TIRE HAVING ZIG-ZAG CIRCUMFERENTIAL MAIN GROOVES

(75) Inventors: Yukio Tozawa, Hiratsuka (JP); Hiroshi Iizuka, Hiratsuka (JP)

(73) Assignee: The Yokohama Rubber Co., LTD, Tokyo (JP)

( * ) Notice: Subject to any disclaimer, the term of this patent is extended or adjusted under 35 U.S.C. 154(b) by 93 days.

(21) Appl. No.: 09/881,699

(22) Filed: Jun. 18, 2001

(65) Prior Publication Data

US 2001/0054465 A1 Dec. 27, 2001

(30) Foreign Application Priority Data

Jun. 21, 2000 (JP) .......................................... 2000-186758

(51) Int. Cl.⁷ .......................... B60C 11/04; B60C 11/13; B60C 101/02
(52) U.S. Cl. ............................ 152/209.21; 152/209.23; 152/209.24; 152/900
(58) Field of Search .................... 152/209.23, 209.24, 152/900, 209.21

(56) References Cited

U.S. PATENT DOCUMENTS 3,055,410 A  * 9/1962 Caulkins
4,258,691 A  * 3/1981 Nakayama
6,412,531 B1 * 7/2002 Janajreh

FOREIGN PATENT DOCUMENTS

| DE | 1480927 | * | 3/1969 |
| JP | 52-44903 | * | 4/1977 |
| JP | 60-197409 | * | 10/1985 |
| JP | 63-166606 | * | 7/1988 |
| JP | 2-155808 | * | 6/1990 |
| JP | 4-372405 | * | 12/1992 |
| JP | 6-48123 | * | 2/1994 |
| JP | 10-272906 | * | 10/1998 |

* cited by examiner

*Primary Examiner*—Steven D. Maki
(74) *Attorney, Agent, or Firm*—Rader, Fishman & Grauer, PLLC

(57) ABSTRACT

Disclosed is a pneumatic tire effectively controlling uneven wear occurring in the vicinity of a main groove even if a groove width of the main groove is narrowed due to change in tread radius during inflation. In the pneumatic tire, with regard to a zigzag-shaped main groove having the groove width narrowed during inflation among a plurality of main grooves provided on the tread surface, an inclination angle of a groove wall near the shoulder with respect to the tread surface is made relatively large in a bent portion near the shoulder, an inclination angle of a groove wall near the center with respect to the tread surface is made relatively large in a bent portion near the center, and regions where the inclination angles of the opposed groove walls are different from each other are uncontinuously arranged in the tire circumferential direction.

2 Claims, 3 Drawing Sheets

PNEUMATIC TIRE HAVING ZIG-ZAG CIRCUMFERENTIAL MAIN GROOVES

BACKGROUND OF THE INVENTION

The present invention relates to a pneumatic tire provided with a plurality of main grooves extended in a tire circumferential direction on the tread surface. More particularly, the present invention relates to a pneumatic tire capable of controlling uneven wear occurring in the vicinity of the main grooves.

Generally, on the tread surface of the pneumatic tire, a single or plural curvature radius (tread radius), as a curvature, in a tire meridian direction is imparted based on the inner surface shape of a die mold. Meanwhile, in the pneumatic tire, the curvature radius on the tread surface tends to be changed during pressurization due to its inner structures such as a belt layer buried inside the tread portion, tread rubber and the like. When a change in curvature radius on the tread surface occurs in the above manner due to inflation, this change is absorbed by the groove portion, resulting in the occurrence of a phenomenon such as bending of the tread portion at the groove bottom as a boundary. Particularly, in a rib tire provided with a plurality of main grooves extended in the tire circumferential direction, the above bending phenomenon is significant.

As described above, when the tread portion is bent at the groove bottom as a boundary, the edge portion of the rib adjacent to the groove does not match the specified curvature radius of the tread surface, and the ground-contacting pressure on the rib edge portion is significantly changed. As a result, uneven wear occurs with the rib edge portion as a starting point, resulting in a growth of railway wear.

SUMMARY OF THE INVENTION

The object of the present invention is to provide a pneumatic tire capable of effectively controlling uneven wear occurring in the vicinity of a main groove even in the case where the groove width of the main groove is narrowed due to a change in the tread radius during inflation.

A pneumatic tire of the present invention for achieving the foregoing object is a pneumatic tire provided with a plurality of main grooves extended in a tire circumferential direction on the tread surface, characterized in that, with regard to some of the main grooves among the foregoing plurality of main grooves, which have zigzag shapes swinging in a tire width direction and also whose groove width is narrowed during inflation, in a bent portion near the shoulder, an inclination angle of a groove wall near the shoulder with respect to the tread surface is made larger than an inclination angle of a groove wall near the center, in a bent portion near the center, the inclination angle of the groove wall near the center with respect to the tread surface is made larger than the inclination angle of the groove wall near the shoulder, and regions where the inclination angles of such opposed groove walls are different from each other are arranged uncontinuously in the tire circumferential direction.

As a result of an intensive research on an occurrence mechanism of uneven wear such as railway wear, the inventors of the present application found out that, in the case where the zigzag-shaped main groove having the groove width narrowed due to the change in tread radius during inflation, a ground-contacting pressure on an edge portion having a concave shape in a bent portion of the main groove is locally increased, and that the uneven wear occurs with that portion as a starting point.

In this connection, as described above, with regard to the zigzag-shaped main groove having the groove width narrowed due to the change in tread radius during inflation, in the bent portion near the shoulder, the inclination angle of the groove wall near the shoulder is made relatively large, and in the bent portion near the center, the inclination angle of the groove wall near the center is made relatively large. In doing so, the rigidity of these regions is reduced, and the increase of the ground-contacting pressure on a rib edge portion is controlled. Hence, the uneven wear such as railway wear occurring in the vicinity of the main groove can be effectively controlled.

More specifically, with regard to the main groove having the groove width narrowed during inflation, it is preferable that, in the bent portion near the shoulder, while the inclination angle of the groove wall near the shoulder with respect to the tread surface is made larger than 90°, the inclination angle of the groove wall near the center is made smaller than 90°, and that, in the bent portion near the center, while the inclination angle of the groove wall near the center with respect to the tread surface is made larger than 90°, the inclination angle of the groove wall near the shoulder is made smaller than 90°. As described above, by opposing the groove wall having the inclination angle smaller than 90° and the overhang-shaped groove wall having the inclination angle larger than 90°, the rigidity of the both sides of the main groove can be effectively adjusted.

Moreover, in the event of arranging uncontinuously the regions where the inclination angles of the opposed groove walls are different from each other (rigidity adjustment portions), for a zigzag pitch Z in the tire circumferential direction of the main groove having the groove width narrowed during the inflation, the foregoing rigidity adjustment portions should be provided in an area within 0.15 Z on both sides of the groove bent portion.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Hereinbelow, description will be made in detail for the constitution of the present invention with reference to the accompanying drawings.

Figure 1:
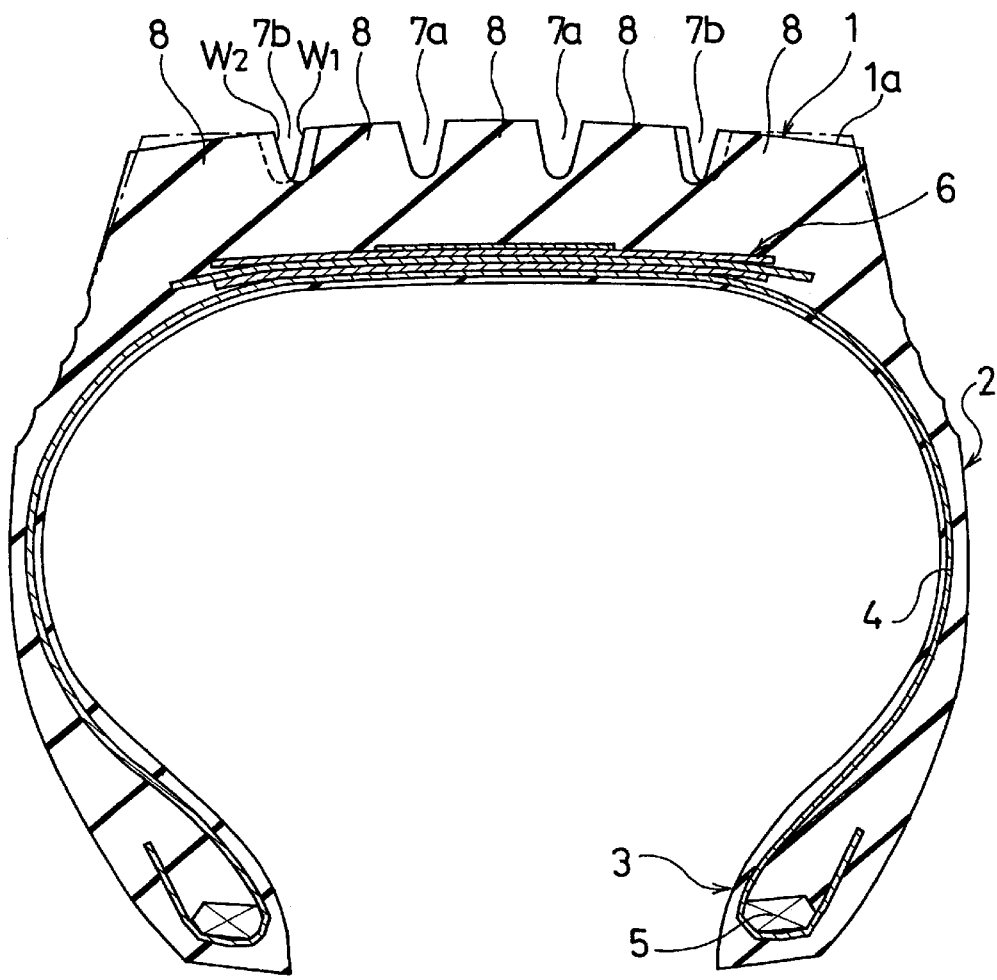
FIG. 1 is a cross-sectional view taken along a meridian direction, showing a pneumatic tire according to an embodiment of the present invention.

FIG. 1 shows a pneumatic tire according to an embodiment of the present invention. A reference numeral 1 denotes a tread portion; a numeral 2 denotes a side wall portion; and a numeral 3 denotes a bead portion. Between a right-and-left pair of bead portions 3 and 3, a carcass layer 4 is bridged, and both end portions thereof in a tire width direction are wound up around bead cores 5, respectively from the tire inner side to the tire outer side. At the outer circumference side of the carcass layer 4 in the tread portion 1, a plurality of belt layers 6 are buried.

Figure 2:
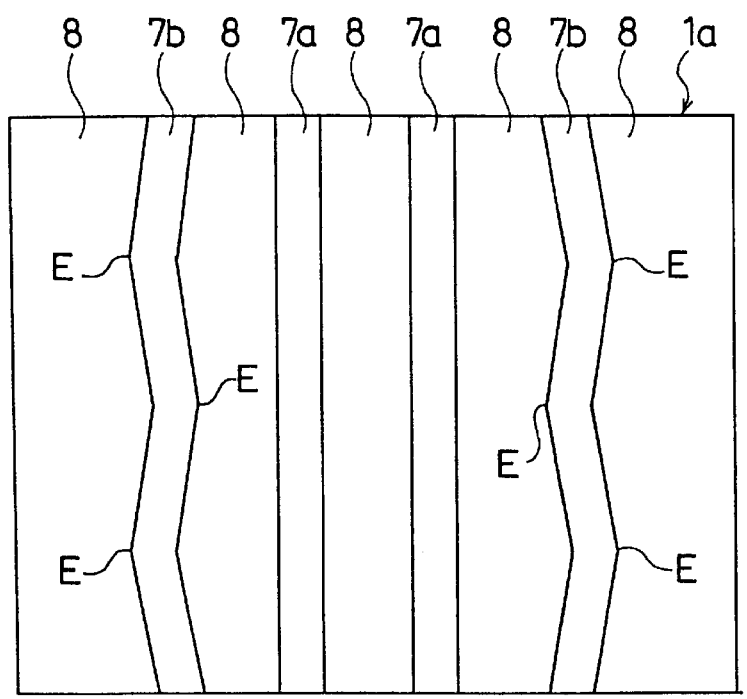
FIG. 2 is a development view showing a tread pattern of the pneumatic tire according to the embodiment of the present invention.

As shown in FIG. 2, on a tread surface 1a, a plurality of straight-shaped main grooves 7a extended in the tire circumferential direction and a plurality of zigzag-shaped main grooves 7b extended in the tire circumferential direction while swinging in the tire width direction are formed. The main grooves 7a are located at the tread center side, and the main grooves 7b are located more to the shoulder side than the main grooves 7a. These main grooves 7a and 7b define the plural columns of ribs 8. It should be noted that side grooves, sipes and the like, which are extended in the tire width direction, may be provided on the tread surface 1a according to needs.

In the above pneumatic tire, due to the inner structure such as the belt layer 6 buried inside the tread portion 1, tread rubber and the like, the curvature radius of the tread surface 1a is changed during inflation, and the tread portion 1 is bent mainly at the groove bottom of the main groove 7b on the shoulder side as a boundary. As a result, the groove width of the main groove 7b is slightly narrowed compared to that before the inflation. It is possible to intentionally design the tire inner structure causing such a bending phenomenon based on the belt layer 6, the tread rubber and the like. For example, if the circumferential rigidity in the vicinity of the tread center is relatively increased, growth of the outer circumference in the vicinity of the shoulder is relatively increased during the inflation.

Figure 3:
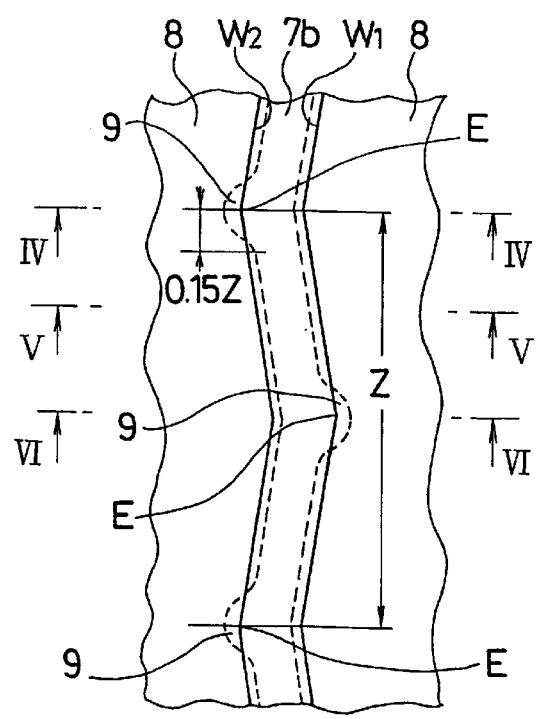
FIG. 3 is an enlarged plan view showing principal portions of the pneumatic tire according to the embodiment of the present invention.

In the main groove 7b having the groove width narrowed during the inflation, as shown in FIG. 3, the inclination angle of the groove wall $W_2$ near the shoulder is made larger than the inclination angle of the groove wall $W_1$ near the center in the bent portion near the shoulder, and in the bent portion near the center, the inclination angle of the groove wall $W_1$ near the center is made larger than the groove wall $W_2$ near the shoulder. In FIG. 3, solid lines of the main groove 7b indicate outlines thereof on the tread surface, and dotted lines indicate outlines thereof at the groove bottom.

Figure 4:
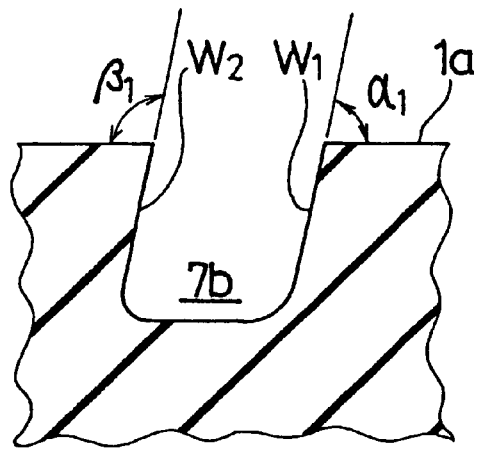
FIG. 4 is a cross-sectional view of FIG. 3, taken along a line IV—IV.
Figure 5:
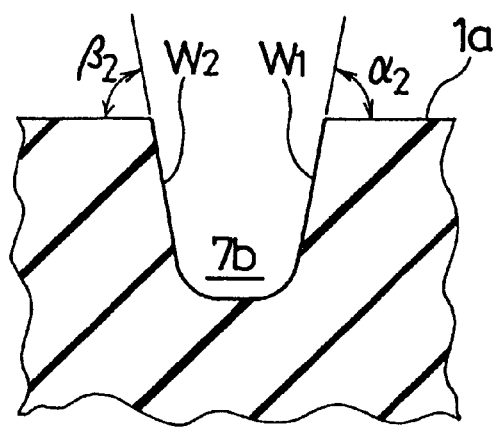
FIG. 5 is a cross-sectional view of FIG. 3, taken along a line V—V.
Figure 6:
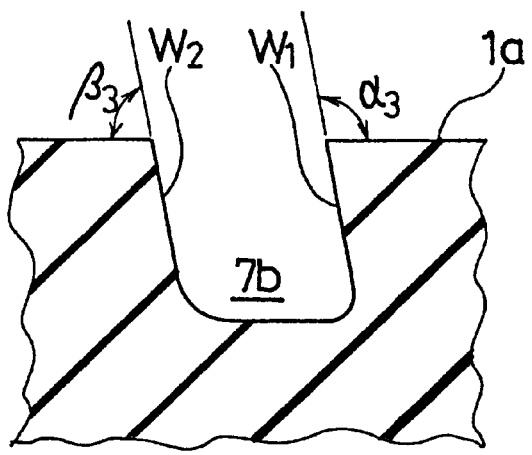
FIG. 6 is a cross-sectional view of FIG. 3, taken along a line VI—VI.

FIGS. 4 to 6 are cross-sectional views of FIG. 3, taken along lines IV—IV, V—V and VI—VI, respectively. As shown in FIG. 4, in the bent portion of the main groove 7b near the shoulder, the inclination angle $\beta_1$ of the groove wall $W_2$ near the shoulder with respect to the tread surface 1a is made larger than the inclination angle $\alpha_1$ of the groove wall $W_1$ near the center with respect to the tread surface 1a. More specifically, in the bent portion near the shoulder, the inclination angle $\beta_1$ of the groove wall $W_2$ near the shoulder is set larger than 90°, and the inclination angle $\alpha_1$ of the groove wall $W_1$ near the center is set smaller than 90°.

As shown in FIG. 5, at an arbitrary position between the bent portions of the main groove 7b, the inclination angle $\alpha_2$ of the groove wall $W_1$ near the center with respect to the tread surface 1a and the inclination angle $\beta_2$ of the groove wall $W_2$ near the shoulder with respect to the tread surface 1a are equal to each other. At the arbitrary position between such bent portions, both of the inclination angle $\alpha_2$ of the groove wall $W_1$ near the center and the inclination angle $\beta_2$ of the groove wall $W_2$ near the shoulder are set smaller than 90°. It should be noted that the inclination angles $\alpha_2$ and $\beta_2$ may be somewhat different from each other within a range smaller than 90°.

As shown in FIG. 6, in the bent portion of the main groove 7b near the center, the inclination angle $\alpha_3$ of the groove wall $W_1$ near the center with respect to the tread surface 1a is made larger than the inclination angle $\beta_3$ of the groove wall $W_2$ near the shoulder with respect to the tread surface 1a. More specifically, in the bent portion near the center, the inclination angle $\alpha_3$ of the groove wall $W_1$ near the center is set larger than 90°, and the inclination angle $\beta_3$ of the groove wall $W_2$ near the shoulder is set smaller than 90°.

As shown by a chain and dotted line of FIG. 1, in the above pneumatic tire, the tread portion 1 is bent mainly at the groove bottom of the main groove 7b on the shoulder side as a boundary during the inflation, and the groove width of the main groove 7b is slightly narrowed compared to that before the inflation. Therefore, as shown in FIG. 2, the ground-contacting pressure on the edge portion E with a concave shape in the main groove bent portion tends to be locally increased. However, as described above, the inclination angle $\beta_1$ of the groove wall $W_2$ near the shoulder is made relatively large in the bent portion of the main groove 7b near the shoulder, and the inclination angle $\alpha_3$ of the groove wall $W_1$ near the center is made relatively large in the bent portion near the center, whereby the rigidity in the vicinity of the edge portion E is reduced to control the increase of the ground-contacting pressure on the rib edge portion. Hence, the uneven wear such as railway wear occurring in the vicinity of the main groove can be effectively controlled.

In the above pneumatic tire, the rigidity adjustment portions 9, in which the inclination angles of the opposed groove walls $W_1$ and $W_2$ of the main groove 7b having the groove width narrowed during the inflation are made to differ from each other, are uncontinuously arranged in the tire circumferential direction as shown in FIG. 3. More specifically, the portions whose rigidity is to be lowered are locally arranged, and the initial rigidity of the portions other than the above is not changed, thus enabling the uneven wear to be effectively controlled. In the event of uncontinuously arranging the rigidity adjustment portions 9 in the tire circumferential direction, for the zigzag pitch Z in the tire circumferential direction of the main groove 7b having the groove width narrowed during the inflation, the rigidity adjustment portions 9 is provided in an area within 0.15 Z on both sides of the groove bent point. If the rigidity adjustment portion 9 is out of the area within 0.15 Z on both sides of the groove bent point, evenness of the ground-contacting pressure is lowered, thus facilitating the uneven wear to occur. It should be noted that, in the case where the zigzag-shaped main groove 7b is not provided with obvious bent points, it is satisfactory if outlines of the main groove are extended toward the bent portion, and an intersection point of these extended lines is assumed as a bent point.

In the present invention, the number of main grooves provided on the tread surface is not particularly limited, and it is satisfactory if the groove width of at least a part of the zigzag-shaped main grooves is narrowed during the inflation.

EXAMPLE

Tires of the present invention and conventional tires, which have the same tire size of 11.00R22.5 and different tread patterns, were produced.

Tire of the the Present Invention

As shown in FIG. 1, in the pneumatic tire provided with a plurality of main grooves extended in the tire circumferential direction on the tread surface, with regard to the main grooves having zigzag shapes swinging in the tire width direction and the groove width narrowed during inflation, the inclination angle $\alpha_1$ of the groove wall near the center is set at 80° while the inclination angle $\beta_1$ of the groove wall near the shoulder is set at 100° in the bent portion near the shoulder in the bent portion near the shoulder, and in the bent portion near the center, while the inclination angle $\alpha_3$ of the groove wall near the center is set at 100°, the inclination angle $\beta_3$ of the groove wall near the shoulder is set at 80°. The regions where the inclination angles of the opposed groove walls are different from each other are uncontinuously arranged in the tire circumferential direction.

Conventional Tire

In FIG. 1, each inclination angle of the both groove walls of the zigzag-shaped main grooves having the groove width narrowed during the inflation are set at 80°.

Uneven wear property of these test tires was evaluated. As a method for evaluating the uneven wear property, two pieces of either the tires of the present invention or the conventional tires were attached as front tires to each of eight trucks, and were made to run mainly on a highway for sixty thousand kilometers. Thereafter, occurrence of the uneven wear on the tread surface of each tire was observed.

As a result, with regard to the conventional tires, the railway wear occurred in six tires among sixteen tires. On the other hand, with regard to the tires of the present invention, the railway wear occurred only in three tires among sixteen tires, including the one only with a sign thereof.

As described above, according to the present invention, in the pneumatic tire provided with the plurality of main grooves extended in the tire circumferential direction on the tread surface, even if the groove width of the main grooves is narrowed due to the change in tread radius during inflation, the uneven wear occurring in the vicinity of the main grooves can be effectively controlled.

Although the preferred embodiment of the present invention has been described in detail, it should be understood that various changes, substitutions and alternations can be made therein without departing from spirit and scope of the inventions as defined by the appended claims.

What is claimed is:

1. A pneumatic tire provided with a plurality of main grooves extended in a tire circumferential direction on a tread surface, wherein, with regard to a main groove having a zigzag shape swinging in a tire width direction and also a groove width narrowed during inflation among said plurality of main grooves, an inclination angle of a groove wall near a shoulder of the tire with respect to the tread surface is made larger than an inclination angle of a groove wall near a center of the tire in a bent portion near the shoulder, the inclination angle of the groove wall near the center with respect to the tread surface is made larger than the inclination angle of the groove wall near the shoulder in a bent portion near the center, and regions where the inclination angles of the opposed groove walls are different from each other are uncontinuously arranged in the tire circumferential direction, wherein, with regard to said main groove having the groove width narrowed during inflation, the inclination angle of the groove wall near the center with respect to the tread surface is set smaller than 90° while the inclination angle of the groove wall near the shoulder is set larger than 90° in the bent portion near the shoulder, and the inclination angle of the groove wall near the shoulder with respect to the tread surface is set smaller than 90° while the inclination angle of the groove wall near the center is larger than 90° in the bent portion near the center.

2. The pneumatic tire according to claim 1, wherein, for a zigzag pitch Z in the tire circumferential direction of said main groove having a groove width narrowed during inflation, each said region where the inclination angles of the opposed groove walls are different from each other is provided within an area of 0.15 Z on both sides of the groove bent point.

* * * * *